United States Patent
Dixon et al.

(10) Patent No.: US 10,549,774 B2
(45) Date of Patent: Feb. 4, 2020

(54) CONTROL STRATEGY FOR A MOTOR OF AN ELECTRIC ASSISTED STEERING SYSTEM

(71) Applicant: TRW Limited, Solihull West Midlands (GB)

(72) Inventors: Christopher David Dixon, Coventry (GB); Peter Geoffrey Scotson, Worcester (GB); Adrian Szabo, Birmingham (GB); Hui Jiang, Birmingham (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 14/436,254
(22) PCT Filed: Oct. 15, 2013
(86) PCT No.: PCT/GB2013/052690
§ 371 (c)(1),
(2) Date: Apr. 16, 2015
(87) PCT Pub. No.: WO2014/060743
PCT Pub. Date: Apr. 24, 2014

(65) Prior Publication Data
US 2015/0246685 A1    Sep. 3, 2015

(30) Foreign Application Priority Data
Oct. 17, 2012    (GB) .................................. 1218674.8

(51) Int. Cl.
*B62D 5/04*    (2006.01)
*H02P 21/22*    (2016.01)
(Continued)

(52) U.S. Cl.
CPC ........... *B62D 5/0481* (2013.01); *B62D 5/046* (2013.01); *B62D 5/0463* (2013.01); *G05B 6/02* (2013.01);
(Continued)

(58) Field of Classification Search
CPC .... B62D 5/0481; B62D 5/046; B62D 5/0463; G05B 6/02; H02P 2006/045
See application file for complete search history.

(56) References Cited

U.S. PATENT DOCUMENTS

| 4,756,375 A | * | 7/1988 | Ishikura | ............... | B62D 5/0463 |
| | | | | | 180/404 |
| 2007/0107973 A1 | | 5/2007 | Jiang et al. | | |

(Continued)

FOREIGN PATENT DOCUMENTS

| DE | 102014108860 A1 * | 12/2015 | ............ H02P 29/027 |
| EP | 1083650 A2 | 8/2000 | |

(Continued)

OTHER PUBLICATIONS

Patent Act 1977: Search Report under Section 17(5), Application No. GB1218674.8, dated Jan. 29, 2013.
(Continued)

*Primary Examiner* — Dale Moyer
(74) *Attorney, Agent, or Firm* — MacMillan, Sobanski & Todd, LLC

(57) ABSTRACT

A control strategy for an electric motor of an electric power assisted steering system of the kind in which a control means produces motor current demand signals that are fed to a motor drive means, the demand signals being dependent on the amount of assistance torque demanded from the motor, the motor drive means being arranged to cause currents to flow in each phase of the motor as required to meet the demanded assistance torque, the control strategy comprising limiting the rate of change of current that is drawn from the electrical supply of the vehicle by the motor in the event that it would otherwise exceed a threshold rate of change.

12 Claims, 5 Drawing Sheets

(51) Int. Cl.
*G05B 6/02* (2006.01)
*H02P 6/04* (2016.01)

(52) U.S. Cl.
CPC ........ *H02P 21/22* (2016.02); *H02P 2006/045* (2013.01)

(56) References Cited

U.S. PATENT DOCUMENTS

| | | | | |
|---|---|---|---|---|
| 2009/0079375 A1* | 3/2009 | Suzuki | ............... | B62D 5/046 318/434 |
| 2010/0109592 A1* | 5/2010 | Li | ............... | B62D 5/046 318/490 |
| 2011/0127934 A1* | 6/2011 | Suzuki | ............... | B62D 5/046 318/400.02 |
| 2017/0129534 A1* | 5/2017 | Sone | ............... | B62D 5/0481 |

FOREIGN PATENT DOCUMENTS

| | | | |
|---|---|---|---|
| EP | 2317642 | A1 | 8/2009 |
| GB | 2177358 | A | 1/1987 |
| JP | 2008285077 | A * | 11/2008 |
| JP | 2008285077 | A | 11/2008 |
| JP | 2012192921 | A * | 10/2012 |
| JP | 2012192921 | A | 10/2012 |
| WO | 2004023639 | A1 | 3/2004 |
| WO | 2008110817 | A2 | 9/2008 |
| WO | 2014060743 | A2 | 4/2014 |

OTHER PUBLICATIONS

PCT International Search Report and Written Opinion, Application No. PCT/GB2013/052690, dated Feb. 24, 2015.
Korean Office Action, Application No. 10-2015-7009931, dated Dec. 12, 2018.

* cited by examiner

CONTROL STRATEGY FOR A MOTOR OF AN ELECTRIC ASSISTED STEERING SYSTEM

CROSS-REFERENCE TO RELATED APPLICATIONS

This application is a national stage of International Application No. PCT/GB2013/052690 filed Oct. 15, 2013, the disclosures of which are incorporated herein by reference in entirety, and which claimed priority to Great Britain Patent Application No. 1218674.8 filed Oct. 17, 2012, the disclosures of which are incorporated herein by reference in entirety.

BACKGROUND OF THE INVENTION

This invention relates to a control strategy for a motor of an electric power assisted steering system.

It is known to provide an electrically power assisted steering system in which an electric motor applies an assistance torque to a part of a steering system to make it easier for the driver to turn the wheels of the vehicle. The magnitude of the assistance torque is determined according to a control algorithm which receives as an input one or more parameters such as the torque applied to the steering column by the driver turning the wheel, the vehicle speed and so on.

For accurate control of the motor torque it is essential to have control over the current applied to the motor. Typically a star connected three phase motor operated according to a Pulse width modulation control/drive strategy is used, each phase being connected to upper and lower drive stage switches connected to the battery supply and an earth respectively. In a PWM strategy each phase is driven with a cyclic PWM drive signal having a first state and a second state and a duty ratio indicative of the ratio of the time spent in each state in a cycle. The torque required from the motor is determined by a control circuit in terms of d-q axis motor current demand signals. These are then converted as required by a drive circuit into three phase currents in the static frame of reference, which requires knowledge of the motor rotor electrical angle of position. A position sensor may be provided that measures the rotor position or the system may be of the sensorless type, such as that taught in WO 2004/023639. Finally, using measurements of the actual current as feedback the pulse width modulation (PWM) duty cycles for each phase that are needed to produce the required actual average currents are calculated and used to drive the motor phases.

The motor draws current from the vehicles electrical supply, typically a battery which is topped up by an alternator that is driven by the drive train of the vehicle (either taking power from the engine or regenerative power during braking). The current drawn by the motor is a function of the battery voltage and the duty ratio of the drive signal applied to each phase.

At times where high assistance is required, the duty ratio of the switches will be high and the overall current drawn by the motor from the battery will in turn be high. For a healthy vehicle electrical system, the high current demand can generally be met by the alternator so the battery does not become depleted. The maximum current draw of the motor should be set to a level which can be met by the alternator. In the case where a sudden change from low assistance demand to high assistance demand occurs the alternator may not be able immediately to provide the current needed in which case some of the current will be drained from the battery until the alternator has had time to ramp up. If the battery is partially or fully depleted, or perhaps disconnected, the sudden increased demand for current may not be met, resulting in a drop in voltage until the alternator, which only reacts to changes in battery voltage. This typically presents itself to the driver of the vehicle by dimming of the lights.

BRIEF SUMMARY OF THE INVENTION

According to a first aspect the invention provides a control strategy for an electric motor of an electric power assisted steering system for a vehicle of the kind in which a control means produces motor current demand signals that are fed to a motor drive means, the demand signals being dependent on the amount of assistance torque demanded from the motor, the motor drive means being arranged to cause currents to flow in each phase of the motor as required to meet the demanded assistance torque, the control strategy comprising limiting the rate of change of current that is drawn from the electrical supply of the vehicle by the motor in the event that it would otherwise exceed a threshold rate of change.

Typically the electrical supply will include a battery connected to an alternator which keeps the battery topped up and provides power to the electric motor when the engine of the vehicle is running. Therefore, in so far as the invention refers to drawing current from an electrical supply it should be construed in general terms as the overall current being drawn from a battery, a battery and an alternator or just an alternator. The later case would be applicable where the battery has been disconnected.

The strategy may comprise producing estimates of the current being drawn from the electrical supply at two or more spaced periods in time, producing an estimated rate of change of the battery current drawn by the motor as a function of the at least two estimates and the elapsed time between estimates. The periods may be very short and effectively represent instantaneous current measurements.

The control strategy, when used with a drive circuit that uses pulse width modulation (PWM) to drive each phase of the motor with cyclic pulse width modulated (PWM) drive signals having a first state and a second state and a duty ratio indicative of the ratio of the time spent in each state within a cycle, may comprise using the motor current demand signals together with a signal representative of the duty ratio of the PWM signal applied to each phase to determine the estimates of the current drawn from the electrical supply, and limiting the rate of change of current drawn from the electrical supply by the motor by modifying the motor current demand signals. The current draw estimate can be expressed as:

$$I = da \cdot \text{Ia\_demand} + db \cdot \text{Ib\_demand} + dc \cdot \text{Ic\_demand} + I_{ECU}$$

where I=estimate of current drawn;
da, db, dc are the duty ratios for the PWM signal for each of the phases a, b and c;
Ia_demand, Ib_demand, Ic_demand are the instantaneous demanded phase currents during the conductive part of the PWM cycle; and
$I_{ECU}$ is an optional offset to account for current drawn by the processing ECU.

The current draw estimated may therefore comprise an average current draw, estimated across at least one PWM cycle. The following equation may be used:

$$I_{bat\_gradient} = \frac{\Delta I_{battery\_estimated}}{\Delta t}$$

Where $I_{bat\_gradient}$ is the rate of change of current draw (the "gradient") and
$I_{battery\_estimated}$ is the same as the estimate of current I in the previous equation.

Using the motor current demand signals rather than actual measurements of the instantaneous or average phase currents is preferred because it is immune to noise that is present in the output of any current measurement circuit that would otherwise be needed. Of course, in an alternative arrangement actual instantaneous measurements the phase current could be used in the equation. The applicants earlier patent GB 2460192B1 discloses a suitable technique for measuring instantaneous currents directly and from that the average current. The teaching of that document is incorporated herein by reference. In a further alternative a current sensor could be used which directly produces an output indicative of the rate of change of current, such as a Rogowski coil.

In a practical system, estimates may be produced repeatedly at defined intervals of time. For example, an estimate may be produced each time a new current demand signal value is generated by the control means, which is governed by the operating rate of the control means. This may be every 1 ms where the operating rate is 1 kHz.

In some systems, the actual phase currents are sampled at a higher rate than the new current demand signal values are generated. This is often done to allow greater control of the actual currents by the drive means, forming part of a feedback loop. Each time an actual sample is received the drive means adjusts the duty cycle so as to reduce the difference between the actual currents that are measured and the demanded currents. In this case, the strategy may sample the duty ratios of each phase at a higher rate than the estimate of current draw is produced, an average duty rate value being used as the value of da, db and dc in generation of the estimate of average current drawn.

For instance, the duty ratios may be adjusted at five times the rate that new current demand values are created, allowing an average of five duty cycle values to be used.

The threshold rate of change of drawn battery current may be a fixed threshold or a dynamic threshold which may vary over time. It may be varied according to one or more operating parameters of the vehicle. These parameters may include the vehicle speed, the state of charge of a battery of the vehicle electrical supply, the electrical supply voltage and others from a vehicle stability system or braking system.

The strategy may comprise causing the control means to produce an intermediate motor current demand signal indicative of the ideal motor current required according to the torque demanded from the motor, and modifying the ideal current demand signals to produce the current demand signals used to drive the motor by applying a scaling factor to the ideal demand signals when limiting is required. At times of low gradient the intermediate and actual will be the same, as no scaling or limiting will be applied. However, when the threshold rate of change of current draw, "gradient threshold", is exceeded the two will differ.

The motor current demand signals may comprise d q current demand components and the strategy may comprise producing from these components the three phase demand currents for each phase in the alpha-beta frame. This may already be available from the control means but if not the strategy may comprise deriving these using the following equations:

$$\begin{cases} I_{a\_demand} = I_{alpha\_demand} \\ I_{b\_demand} = \frac{1}{2}(\sqrt{3}\, I_{beta\_demand} - I_{alpha\_demand}) \\ I_{c\_demand} = -(I_{a\_demand} + I_{b\_demand}) \end{cases}$$

$$\begin{cases} I_{alpha\_demand} = I_{d\_demand} \cdot \cos(\theta_{predict}) - I_{q\_demand} \cdot \sin(\theta_{predict}) \\ I_{beta\_demand} = I_{d\_demand} \cdot \sin(\theta_{predict}) + I_{q\_demand} \cdot \cos(\theta_{predict}) \end{cases}$$

Where $I_{alpha\_demand}$ and $I_{beta\_demand}$ are the current components in the stationary alpha-beta frame, $I_{d\_demand}$ and $I_{q\_demand}$ are the d and q axis current demand signals, and $\theta$ is the rotor electrical position.

The strategy may make an allowance for additional current draw on the battery by the control means. This is typically embodied as an ECU running a suitable control algorithm and the current consumed can therefore be predicted. An offset current draw value representing current drawn by the ECU may be added to the estimate of current drawn by the motor to produce an overall current draw estimate for the electric power steering system, and the strategy may limit the current draw gradient of the motor if this overall current draw exceeds a threshold.

The strategy may comprise passing the estimate of average current drawn through a filter to produce a filtered estimate average current draw value. The filter may comprise a low pass filter with a passband tuned to reduce the noise in the estimated battery gradient signal.

The strategy may comprise feeding the estimated battery current rate of change to a PI (or PID) controller, the output of the PI controller modifying the maximum current that can be demanded by the motor as part of a feedback control loop.

The PI controller may be disabled in the event that the estimated battery current gradient is within a tolerable range of an enable threshold battery rate of change. This enable threshold may differ from the maximum threshold rate of change allowed from the motor current.

The enable threshold battery rate of change may be a current gradient value in units of Amps per second (A/s). The maximum threshold gradient may also be in the same units.

The proportional and integral gain values of the PI controller may be chosen to provide a desired amount of damping to the modification of the maximum current demand. If damping is too low and a sudden limit is imposed this may cause rapid variations in the value of the demand signals which are undesirable. If damping is too high then the limit of the current draw may be introduced too slowly allowing excessive drain of the battery to occur.

Typically the battery will be connected to an alternator which provides electrical power to keep the battery topped up and to drive the electrical loads. Therefore, in so far as the invention relates to producing an estimate of battery current draw gradient it should be understood that this means in more general terms the overall current being drawn from the battery system, the system including the battery and the alternator. The electric motor would still operate even if the battery had failed or was disconnected as long as the alternator was functioning, and in that extreme case the estimate of the battery current gradient would be an estimate of the current gradient drawn from the alternator.

According to a second aspect the invention provides a control means for an electric motor of an electric power assisted steering system of the kind in which the control means produces motor current demand signals that are fed to a motor drive means, the demand signals being dependent on the amount of assistance torque demanded from the motor, the motor drive means being arranged to provide currents to flow in each phase of the motor as required to meet the demanded motor torque, the control means comprising: estimator means adapted to optionally produce estimates of the current being drawn from the electrical supply at spaced periods in time and from these to produce an estimated rate of change of the current drawn by the motor as a function of the estimates and elapsed time between estimates, and in the event that the rate of change of current exceeds a threshold rate of change of current the controller is adapted to limit the maximum current that is drawn by the motor.

The control means may be combined with the drive means in a combined control and drive circuit. This may be implemented in hardware, in software or in a combination of both.

Other advantages of this invention will become apparent to those skilled in the art from the following detailed description of the preferred embodiments, when read in light of the accompanying drawings.

DETAILED DESCRIPTION OF THE INVENTION

Figure 1:
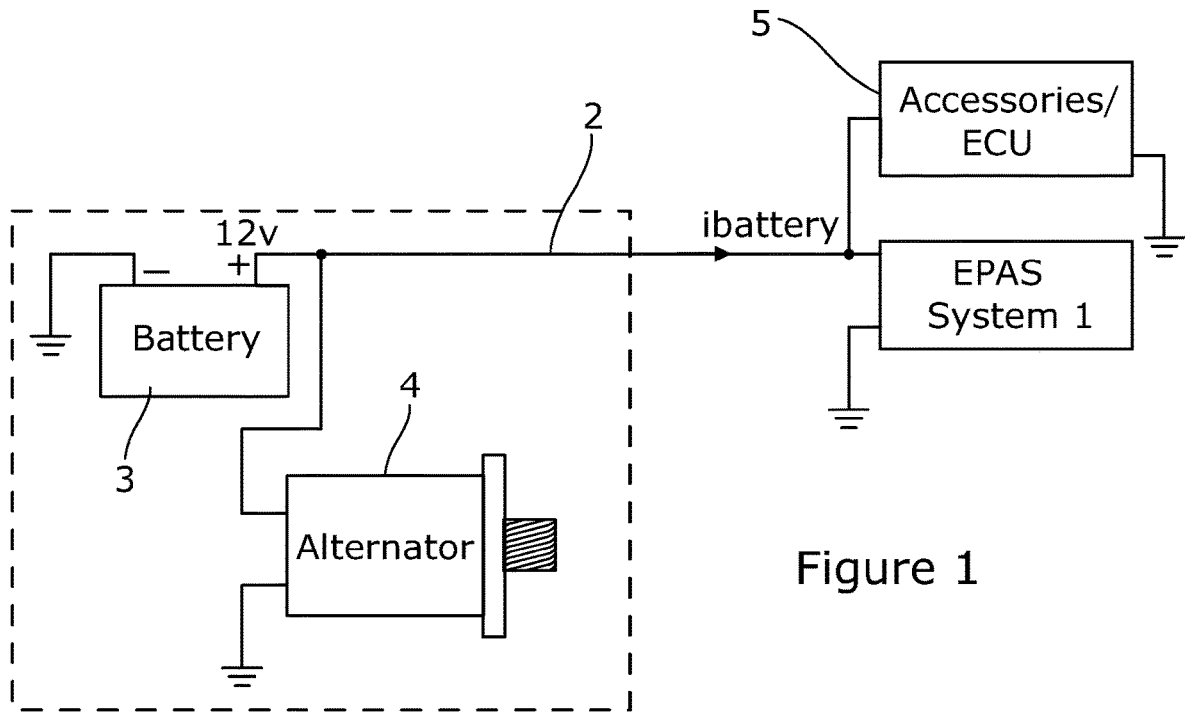
FIG. 1 is an overview of a part of a vehicle electrical system showing the connection of an electric power steering system the electrical supply.

As shown in FIG. 1 a vehicle is provided with an electric power assisted steering (EPAS) system that draws current $i_{battery}$ from the vehicle electrical supply across power rail 2. The supply comprises a battery 3, typically rated at 12 volts DC, which is in turn topped up by an alternator 4. The battery also provides current to other vehicle accessories 5.

Figure 2:
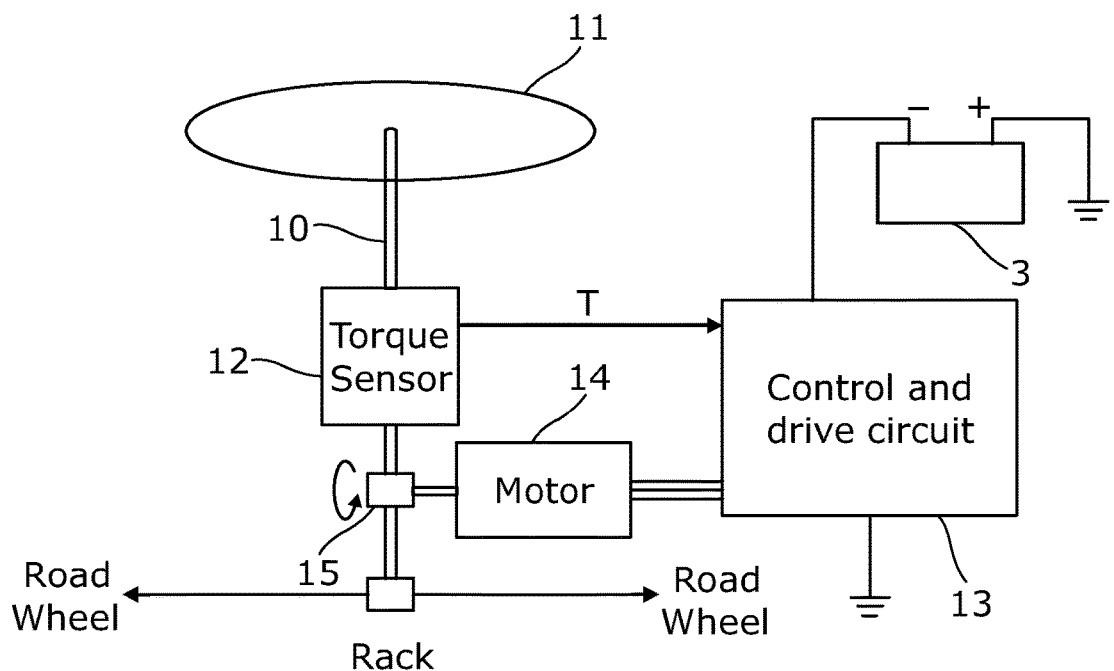
FIG. 2 is a schematic representation of the key parts of an exemplary electric power steering system to which the control strategy of the present invention can be applied.

The EPAS system 1 is shown schematically in FIG. 2 of the drawings. It includes a steering column 10 attached to a steering wheel 11, a torque sensor 12 which measures the torque applied to the steering column 10 by the driver as they turn the steering wheel, a motor control and drive circuit 13 and an electric motor 14.

The torque sensor 12 may be attached to a quill shaft in series with the column 10, and the motor 14 may act upon the steering column or other part of the steering system, typically through a gearbox 15.

The motor 14 typically comprises a three phase wound stator element and a rotor having for example six embedded magnets within it which in this instance are arranged so as to provide six poles which alternate between north and south around the rotor. The rotor therefore defines three direct or d axes evenly spaced around the rotor and three quadrature or q axes interspaced between the d axes. The d axes are aligned with the magnetic poles of the magnets where the lines of magnetic flux from the rotor are in the radial direction, and the q axes are spaced between the d axes where the lines of magnetic flux from the rotor are in the tangential direction.

The three motor stator windings are connected in a star network. The drive circuit part of the control and drive circuit 13 comprises a three phase bridge forming a switching stage. Each arm of the bridge comprises a pair of switches in the form of a top transistor and a bottom transistor connected in series between the battery supply rail 2 and ground line. The motor windings are each tapped off from between a respective complementary pair of transistors. The transistors are turned on and off in a controlled manner by a control and drive circuit to provide pulse width modulation (PWM) of the potential applied to each of the terminals, thereby to control the potential difference applied across each of the windings and hence also the current flowing through the windings which depends on the duty cycle d for each phase a, b or c of the motor. This in turn controls the strength and orientation of the magnetic field produced by the windings, and in turn the motor torque.

The torque signal output from the torque sensor 12 is fed to an input of the motor control means of the control and drive circuit which produces a set of motor current demand signals. The demand signals are in the form of two current demand signals in the d-q axis reference frame. The value of the d axis and q axis demand signals is dependent upon the measured torque and is set according to an assistance torque strategy. This can be implemented using a look up table perhaps stored in a memory of the control means which stores current demand signal values against torque signal values.

The drive circuit converts the d-q axis currents output from the control means into three current demand components in a static reference frame, one for each phase of the motor a, b or c. These demand currents are then converted by the drive circuit, in combination with an estimate of the rotor position, into suitable PWM signals that are supplied to the switching motor phases by PWM of the switches. A range of PWM switching strategies are known in the art and so will not be described in detail here. The switch arrangement is well known and described in such documents as EP 1083650A2.

Both the control means part and drive circuit part of the control and drive circuit may be implemented using an electronic control unit running software that is stored in an area of memory.

Figure 3:
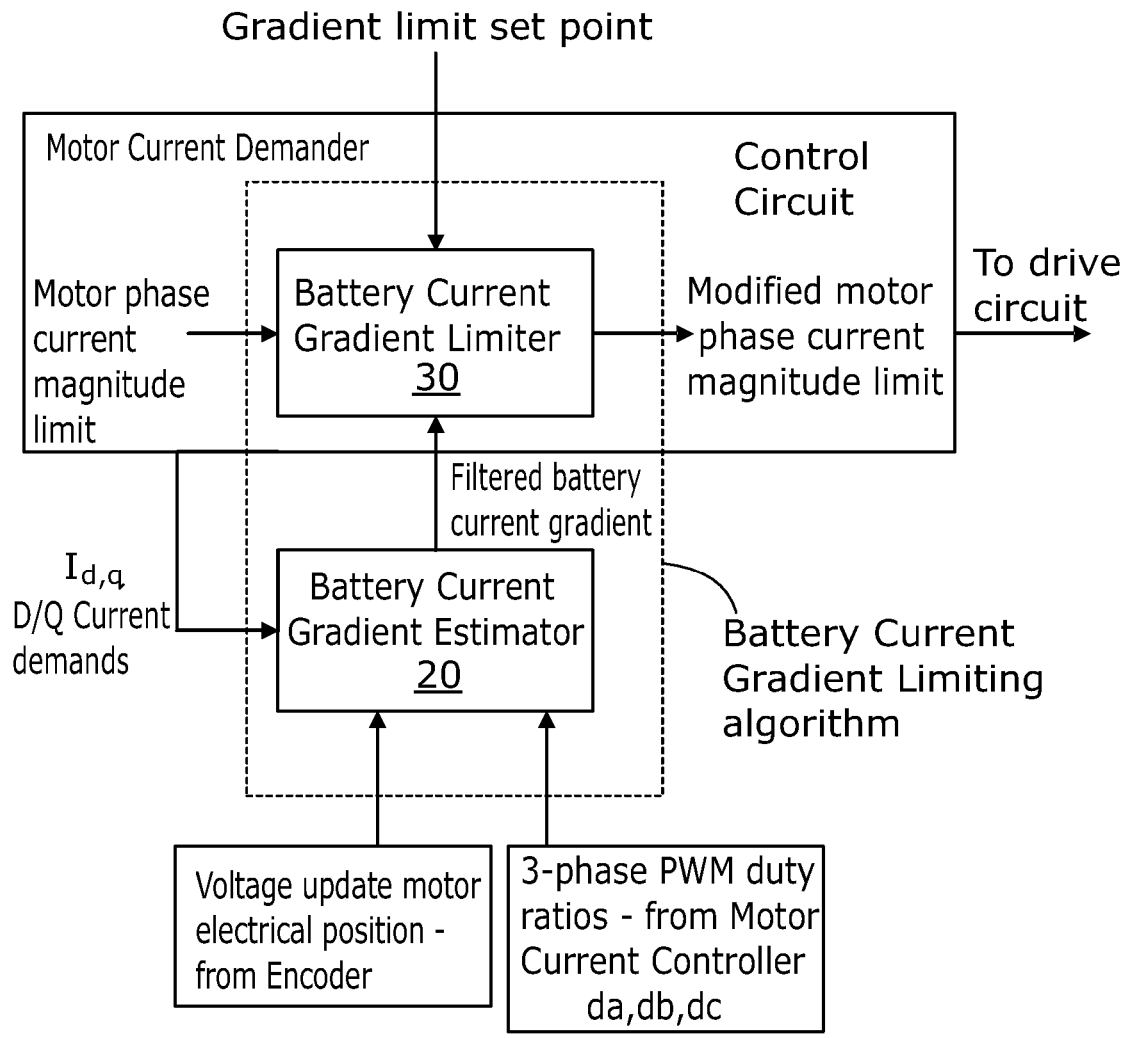
FIG. 3 is a block diagram showing how the control strategy of the present invention is integrated into the control and drive means of the steering system.
Figure 4:
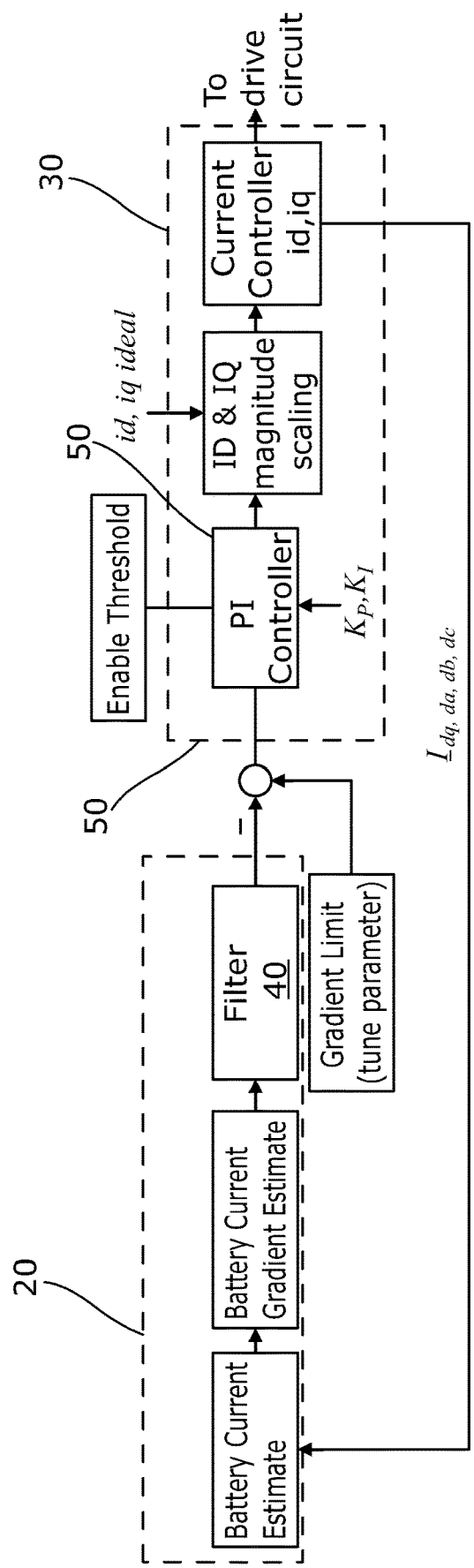
FIG. 4 is a block diagram providing an overview of the different steps of the algorithm, the input parameters and the outputs.
Figure 8:
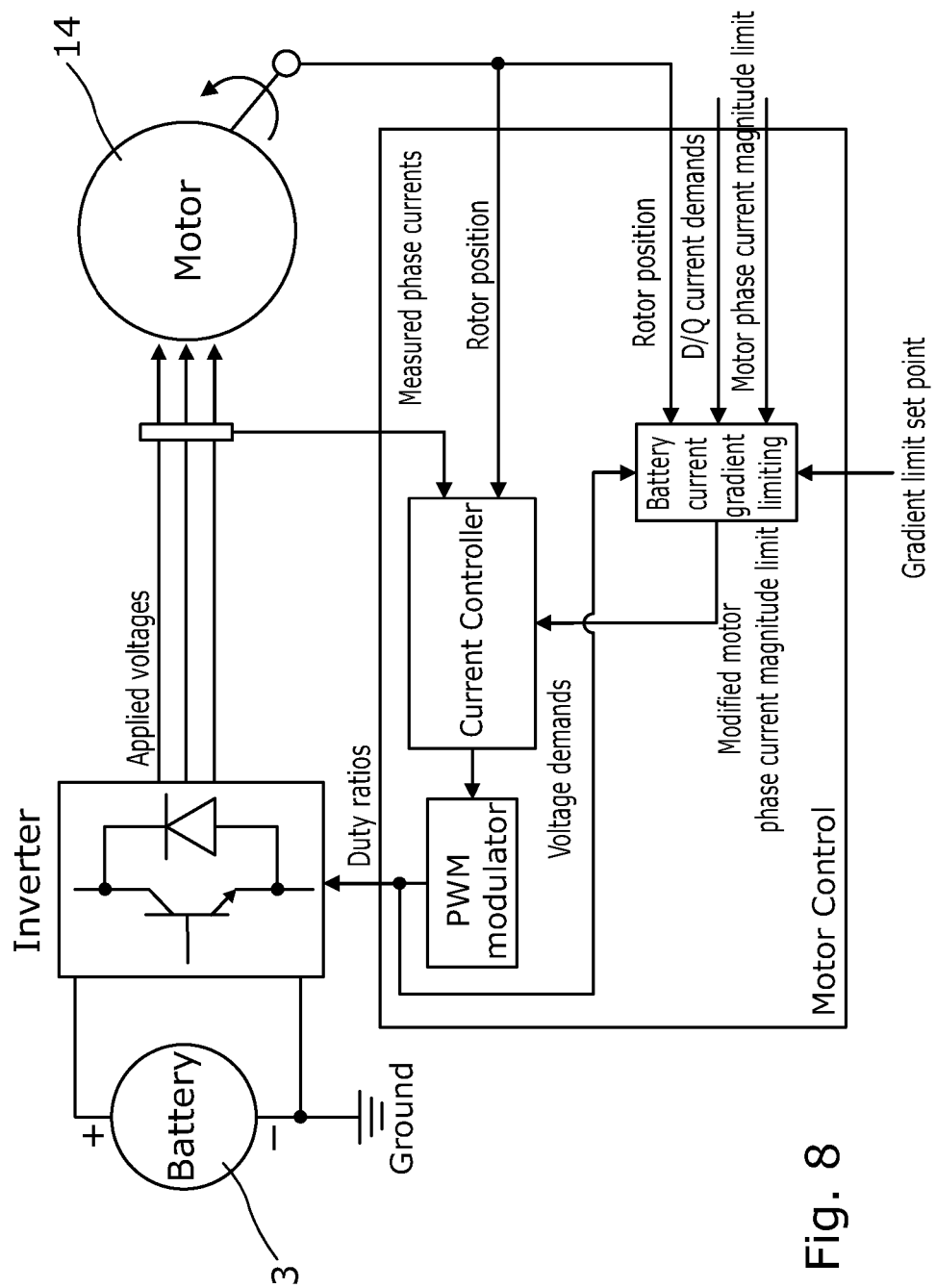
FIG. 8 is an alternative representation of the apparatus illustrating the flow of signals between the various functional parts.

As shown in FIGS. 3, 4 and 8 of the accompanying drawings the control means part of the control and drive circuit also includes a battery current gradient limiting algorithm which in turn has two distinct parts:

1) An estimator 20 that estimates the battery current gradient, by which we mean the rate of change in the current drawn from the battery by the motor; and 2) A limiter 30 that limits the rate of change of battery current drawn by the motor if it exceeds a threshold or is within a range of values around a threshold.

The provision of the gradient limiter has been found by the applicant to be useful where the ability of the electrical supply to deliver high rates of change of current is compromised, as might happen if the battery is partially or fully depleted or becomes disconnected. Its function is to ensure that the rate of change of battery current drawn by the motor (the battery gradient) does not exceed a predefined threshold.

The gradient limiter part receives as an input the d-q axis current demands generated by the control means id, iq. It also receives as an input the duty ratio of each phase of the motor drive circuit, and the motor electrical position. The motor position is needed to convert the d-q reference frame demands into the start reference frame of the stator, i.e. to align the stator's electro-magnetic field with the permanent magnets of the rotor in order to generate the demanded torque as the rotor turns.

The d-q axis motor current demand signal is first sampled each time a new value is generated by the control means and converted by the stationary frame according to the expressions:

$$\begin{cases} I_{a\_demand} = I_{alpha\_demand} \\ I_{b\_demand} = \frac{1}{2}\left(\sqrt{3}\, I_{beta\_demand} - I_{alpha\_demand}\right) \\ I_{c\_demand} = -(I_{a\_demand} + I_{b\_demand}) \end{cases}$$

$$\begin{cases} I_{alpha\_demand} = I_{d\_demand} \cdot \cos(\theta_{predict}) - I_{q\_demand} \cdot \sin(\theta_{predict}) \\ I_{beta\_demand} = I_{d\_demand} \cdot \sin(\theta_{predict}) + I_{q\_demand} \cdot \cos(\theta_{predict}) \end{cases}$$

These values are indicative of the demanded current for each phase. The chosen PWM switching strategy converts these to PWM waveforms with duty ratios da, db and dc. These are then used by the gradient limiting circuit to produce an estimate of the battery current being drawn by the motor using the equation:

$$I = da\_ \cdot I_{a\_demand} + db \cdot I_{b\_demand} + dc \cdot I_{c\_demand} + I_{ECU}$$

where I battery current estimate;
da, db, dc are the duty ratios for the PWM signal for the phases a, b and c;
$I_{a\_demand}$, $I_{b\_demand}$ and $I_{c\_demand}$ are the demanded phase currents; and
$I_{ECU}$ is an optional offset to account for current drawn by the processing ECU.

$I_{ECU}$ may comprise a component indicative of the current consumed by components of the electric power assisted steering system other than the motor phases. Typically these components include the drive circuit, the control circuit, switches, a power filter and so on. The control circuit is often embodied as a program in an ECU. This component may be a constant that is estimated when the motor is a zero speed and no, or substantially no, current is flowing in the windings.

In a simplest embodiment the demanded duty ratio for each phase is applied directly to the switches of that phase. In some cases, it may be advantageous to calculate modified duty ratios from the demanded duty ratios, by allowing for switching times for the switches in the duty cycle of each state. This is a so called "dead-time" compensation, the duty cycles being increased or decreased slightly depending on the characteristics of the switch. The modified duty ratio may then be used to calculate average currents.

The preceding calculation is repeated periodically at time intervals t, and from the difference between sequential pairs of estimates a current draw gradient $I_{bat\_gradient}$ is obtained by differentiation, which can be expressed according to the expression:

$$I_{bat\_gradient} = \frac{\Delta I_{battery\_estimated}}{\Delta t}$$

This equation is solved each time a fresh set of current demand signal value is produced by the control circuit The demand current values are recalculated every 1 millisecond, but the actual current is measured and the PWM duty cycles adjusted at 5 times this rate. The duty ratio values used in the equations may therefore be averaged values obtained from sampling all five duty ratios over the time period t.

This estimated current draw gradient, which indicates the rate of change of current drawn from the electrical supply by the motor and the ECU, is passed to a filter 40. The estimate of gradient may otherwise be rather noisy as it is a differentiation of the estimated current. The algorithm of this embodiment uses a 2nd order low pass filter consisting of two first order low pass filters connected in series with a 16 millisecond time constant.

The filtered estimated current gradient is subtracted from a gradient limit set point to produce a difference value. The set point represents a peak allowable rate of change of current draw, which may be preset or may be variable depending on the operating parameters of the vehicle such as vehicle speed, rate of acceleration and so on. The difference value will have a positive value if the set point is not exceeded and a negative value if it is exceeded.

The difference value is then fed into a PI controller 50. The PI controller 50 is enabled if the difference value is below a predefined limit, otherwise the PI controller is disabled and no limiting is applied as it is considered to be not required.

The PI controller 50 when enabled outputs a value which is passed through a signal conditioning block to provide a scaling value. This scaling value is applied to the ideal d-q axis motor current demand signal values output from the control circuit to produce a new pair of d-q axis motor current demand signals which are limited so that they do not result in an excess increase in the motor current drawn from the battery.

The gradient limiter therefore limits the rate of change of current that is drawn by the motor from the battery at time where the rate of change would exceed a threshold. The PI controller 50 proportional and integral terms are chosen in such a way that the transients are neither under or over damped during times of limiting, to follow as closely as possible the ideal d-q axis current demand signal values.

Figure 5:
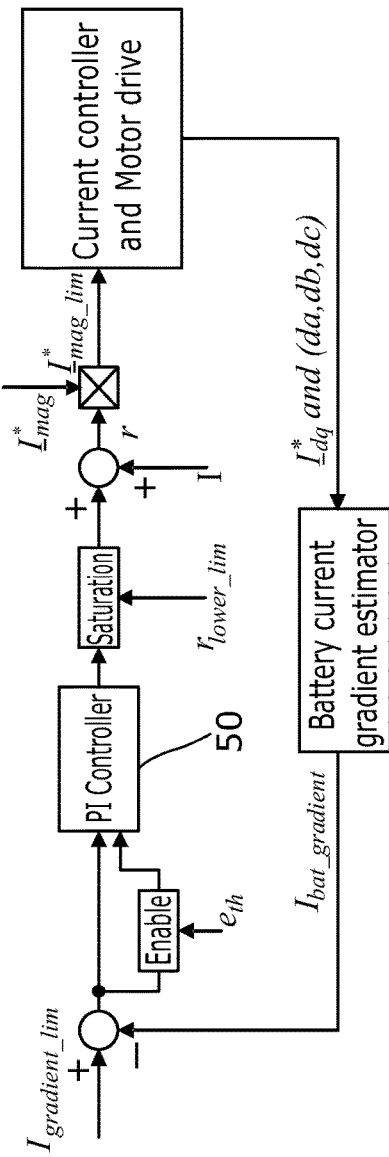
FIG. 5 is a representation of one particular exemplary implementation of the strategy illustrated in FIG. 4.

FIG. 5 illustrates in more detail, the various stages of the strategy used by the battery gradient estimator and limiter, although it should be understood that this is only an example of one way in which the strategy can be implemented. The limiter runs once a new torque demand is detected (roughly 1 ms). The estimate of battery current gradient is firstly taken from the gradient estimator, which is compared with the predefined limit, $I_{gradient\_lim}$, which is a tunable variable defining the maximum allowed battery current gradient in A/ms, and is by default set to 0.3 A/ms (300 A/s). If the difference between them is less than the enabling threshold, $e_{th}$, another tunable variable, the PI controller is enabled, otherwise the PI controller is reset and no gradient limiting is performed. The output of the PI controller is saturated when it is less than $r_{lower\_lim}$ (a negative quantity) or greater than zero, ranging from $r_{lower\_lim}$ to zero, where $r_{lower\_lim}$ is the lower limit of the controller output and ranges from −1 to 0 and is by default set to −0.5. It is then offset by the addition of 1 to yield the output, r, within −$r_{lower\_lim}$ to 1, +0.5 to +1. The limited current demand magnitude, *$I_{mag\_lim}$, is finally obtained by multiplying r with the original demand magnitude, *$I_{mag}$. Note that the PI controller gains, $K_p$ and $K_i$, are also tunable variables scaled at 1024/1.

Figure 6:
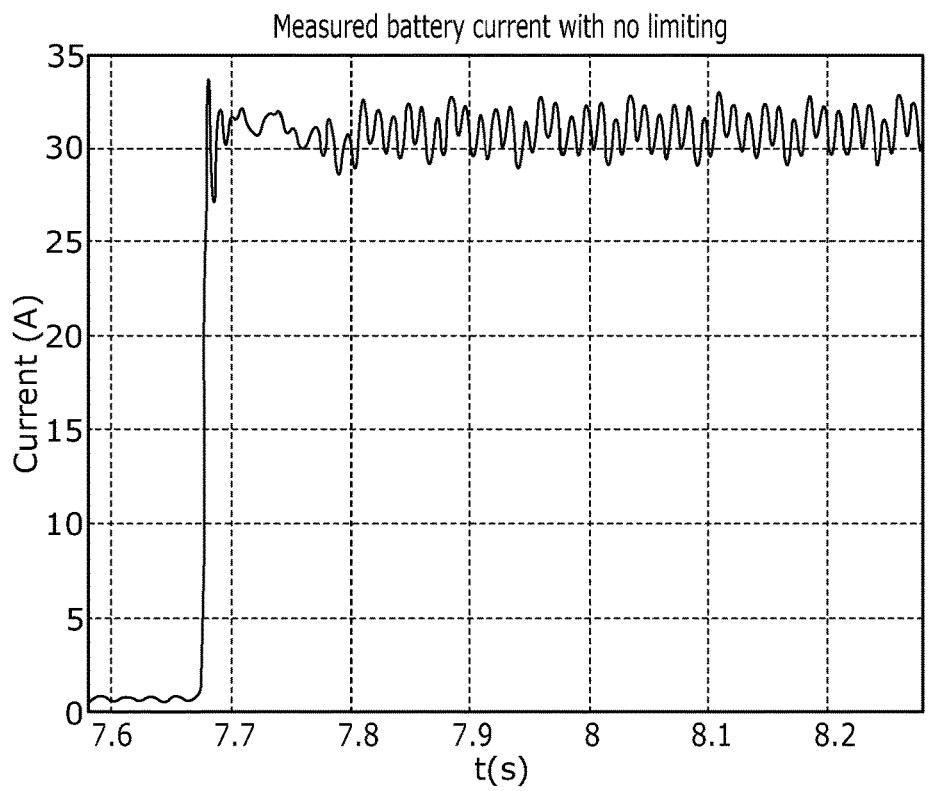
FIG. 6 shows the change in measured battery current over time in response to a demand for a rapid increase in motor torque, and hence current, without the battery current gradient limiter.
Figure 7:
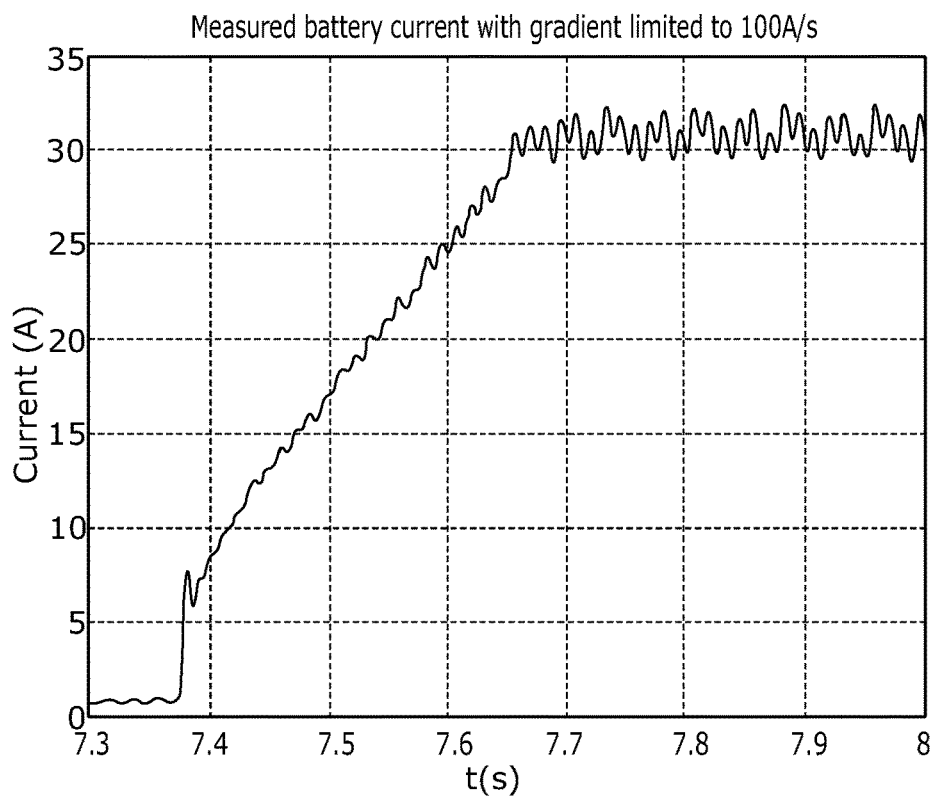
FIG. 7 shows the equivalent change when the battery current gradient limiter is active.

FIGS. 6 and 7 illustrate the effect of the battery current gradient limiter for the case where a step change in battery current demand from Zero Amps to 30 Amps is suddenly introduced with the battery gradient limiter not present (FIG. 6) and present (FIG. 7). As can be seen in FIG. 7 the rate of change has been limited and there is no obvious underdamping or overdamping of the current. FIG. 7 shows the case where the gradient limit is set to 100 A/second.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A control apparatus for an electric motor of an electric power assisted steering system in which a control means produces motor current demand signals that are fed to a motor drive means, the demand signals being dependent on the amount of assistance torque demanded from the motor, the motor drive means being arranged to cause currents to flow in each phase of the motor as required to meet the demanded assistance torque, the control apparatus comprising a control circuit having a processor and being configured to limit a rate of change of current that is drawn from an electrical supply of a vehicle by the motor responsive to determining that the rate of change of current that is drawn would otherwise exceed a threshold rate of change, and in which the threshold rate of change of drawn current is a dynamic threshold which varies over time according to one or more operating parameters of the vehicle.

2. The control apparatus according to claim 1 which comprises producing estimates of the rate of change of current drawn by the motor at two or more spaced moments in time, and producing an estimated rate of change of the current drawn by the motor as a function of at least two estimates and an elapsed time between the at least two estimates.

3. The control apparatus according to claim 2 for a drive circuit that uses pulse width modulation to control the current flowing in each phase of the motor, the apparatus comprising using the motor current demand signals together with a signal representative of the duty ratio of the pulse width modulation signal applied to each phase to determine the estimates of the current being drawn, and limiting the rate of change of current drawn by the motor by modifying the motor current demand signals.

4. The control apparatus according to claim 3 in which the estimate of current drawn is derived by the equation:

$$I = da \cdot Ia + db \cdot Ib + dc \cdot Ic + I_{ECU}$$

where I is the current estimate;
da, db, dc are duty ratios for the pulse width modulation signal for phases a, b and c;
Ia, Ib, Ic are demanded phase currents; and $I_{ECU}$ is an optional offset to account for current drawn by a processing electronic control unit of the motor or other ancillaries.

5. The control apparatus according to claim 4 in which the duty ratios of each phase are sampled at a frequency higher than the frequency at which the current demand signal is updated, and an average duty ratio value is used as the duty cycle values when producing the estimate of current drawn.

6. The control apparatus according to claim 2 in which estimates are produced each time the current demand signal is updated, which is governed by an operating frequency of the control means.

7. The control apparatus according to claim 2 comprising passing the estimated rate of change of current drawn through a low pass filter to produce a filtered value.

8. The control apparatus according to claim 2 which comprises feeding the estimated rate of change of current drawn to a PI or PID controller which is used to modify the motor demand currents using closed loop control.

9. The control apparatus according to claim 1 which comprises causing the control means to produce a motor current demand signal indicative of an ideal motor current required according to the torque demanded from the motor, and modifying the ideal motor current demand signal to produce the current demand signals used to drive the motor by applying a scaling factor to the ideal motor current demand signals when limiting is required.

10. The control apparatus according to claim 1 in which the motor current demand signals comprise d - q current demand components and the apparatus comprises producing from the d - q current demand components together with an estimate of motor position demanded phase currents for each phase in the alpha-beta frame.

11. The control apparatus of claim 1 wherein the one or more operating parameters of the vehicle is selected from the group consisting of one or more of a vehicle speed, a state of charge of a battery of the electrical supply of the vehicle, and an electrical supply voltage.

12. A control apparatus for an electric motor of an electric power assisted steering system in which a control means produces motor current demand signals that are fed to a motor drive means, the demand signals being dependent on the amount of assistance torque demanded from the motor, the motor drive means being arranged to cause currents to flow in each phase of the motor as required to meet the demanded assistance torque, the control apparatus comprising a control circuit having a processor and being configured to limit a rate of change of current that is drawn from an electrical supply of a vehicle by the motor responsive to determining that the rate of change of current that is drawn would otherwise exceed a threshold rate of change, which comprises producing estimates of the rate of change of current drawn by the motor at two or more spaced moments in time, and producing an estimated rate of change of the current drawn by the motor as a function of at least two estimates and an elapsed time between the at least two estimates, a drive circuit that uses pulse width modulation to control the current flowing in each phase of the motor, the apparatus comprising using the motor current demand signals together with a signal representative of the duty ratio of the pulse width modulation signal applied to each phase to determine the estimates of the current being drawn, and limiting the rate of change of current drawn by the motor by modifying the motor current demand signals, and in which the estimate of current drawn is derived by the equation:

$$I = da \cdot Ia + db \cdot Ib + dc \cdot Ic + I_{ECU}$$

where I is the current estimate;
da, db, de are duty ratios for the pulse width modulation signal for phases a, b and c;
Ia, Ib, Ie are demanded phase currents; and
$I_{ECU}$ is an optional offset to account for current drawn by a processing electronic control unit of the motor or other ancillaries.

\* \* \* \* \*

UNITED STATES PATENT AND TRADEMARK OFFICE
CERTIFICATE OF CORRECTION

PATENT NO. : 10,549,774 B2
APPLICATION NO. : 14/436254
DATED : February 4, 2020
INVENTOR(S) : Dixon et al.

Page 1 of 1

It is certified that error appears in the above-identified patent and that said Letters Patent is hereby corrected as shown below:

In the Claims

Column 11, Claim 12, Line 2, delete "de" and insert --dc--;

Column 11, Claim 12, Line 4, delete "Ie" and insert --Ic--.

Signed and Sealed this
Twenty-second Day of September, 2020

Andrei Iancu
*Director of the United States Patent and Trademark Office*